United States Patent [19]
Stearns

[11] 3,977,183
[45] Aug. 31, 1976

[54] ADJUSTING MECHANISM AND METHOD FOR FUEL CONTROL

[75] Inventor: Charles F. Stearns, East Longmeadow, Mass.

[73] Assignee: United Technologies Corporation, Hartford, Conn.

[22] Filed: Dec. 6, 1974

[21] Appl. No.: 530,455

[52] U.S. Cl. ............................ 60/39.02; 60/39.31; 137/315; 251/291
[51] Int. Cl.² .......................................... F02C 7/20
[58] Field of Search ......... 60/39.31, 39.02, 39.28 R, 60/39.27; 137/315; 251/291

[56] References Cited
UNITED STATES PATENTS

| | | | |
|---|---|---|---|
| 2,409,178 | 10/1946 | Allison | 60/39.31 UX |
| 3,153,989 | 10/1964 | Roberts | 60/39.31 X |
| 3,395,886 | 8/1968 | Fawkes | 137/315 X |
| 3,590,653 | 7/1971 | Dreckmann | 60/39.27 |
| 3,677,139 | 7/1972 | Wheeler | 137/315 |
| 3,710,568 | 1/1973 | Rice | 60/39.31 R |
| 3,842,594 | 10/1974 | Grunert | 60/39.28 R |

*Primary Examiner*—Clarence R. Gordon
*Attorney, Agent, or Firm*—John D. Del Ponti; Norman Friedland

[57] ABSTRACT

The indexing of the power lever of a fuel control for a turbine type of power and the mechanism necessary to effectuate the same is simplified so as to facilitate the installation of the fuel control relative to the remotely cockpit-mounted power lever. Preselecting a point on the power lever shaft relative to a pair of outwardly spaced oriented mounting points, permits a factory-adjusted-fuel control to be installed to a complementary adaptor on the aircraft eliminating the customary field adjustments and certain adjusting mechanisms.

7 Claims, 6 Drawing Figures

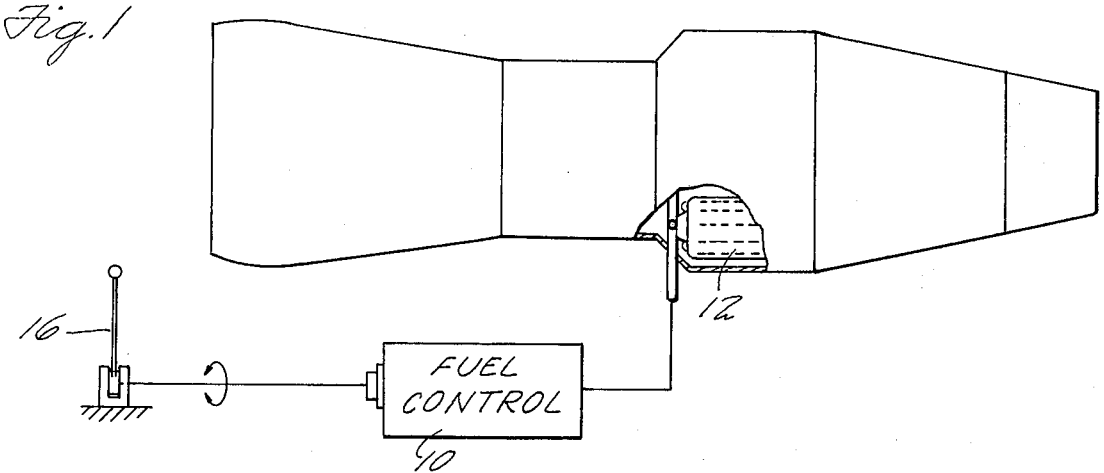
Fig.1
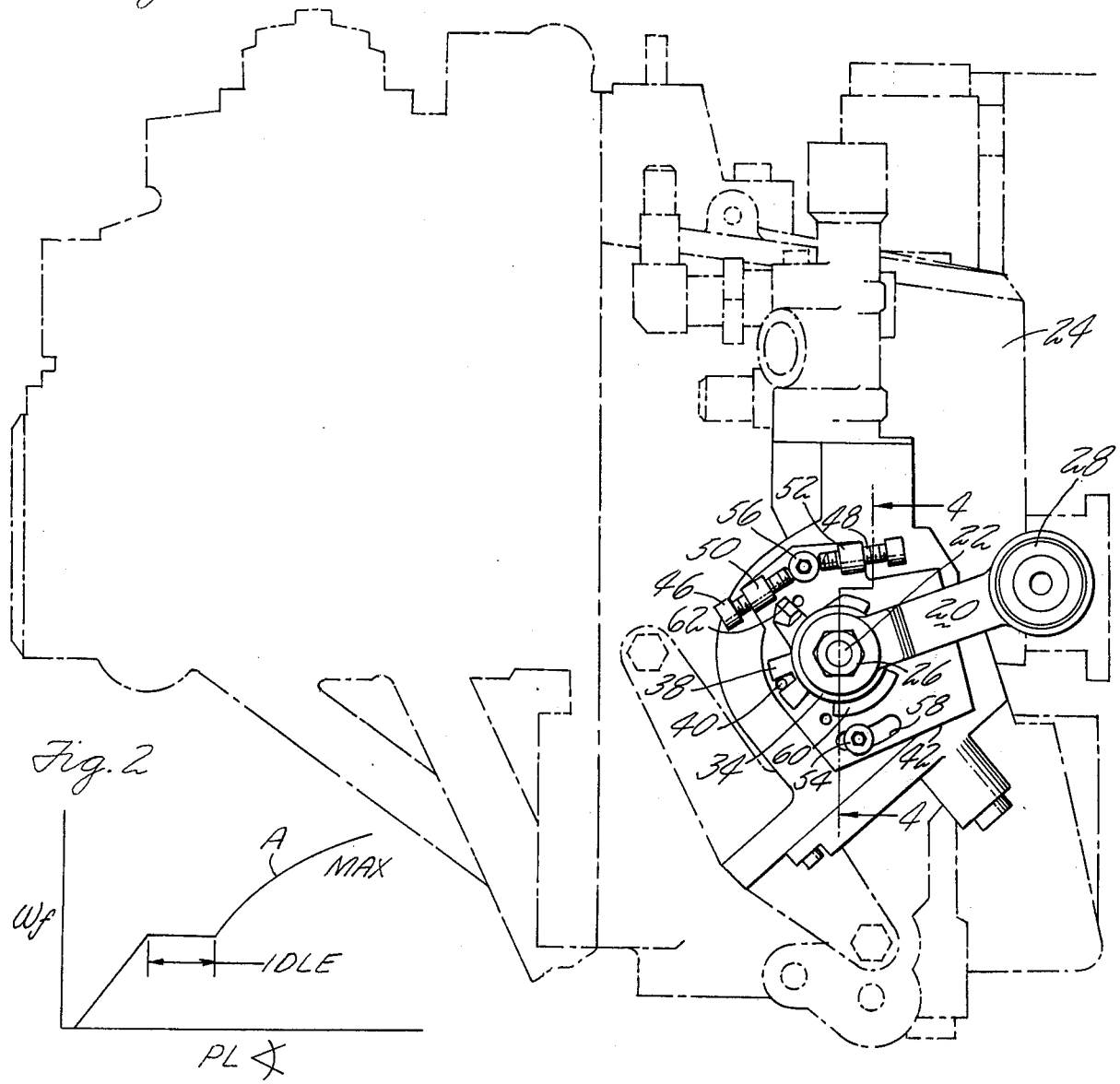
Fig.3 PRIOR ART
Fig.2

ADJUSTING MECHANISM AND METHOD FOR FUEL CONTROL

BACKGROUND OF THE INVENTION

This invention relates to fuel controls for turbine types of power plants and particularly to the power lever and associated indexing adjustment mechanism and the method of the setting thereof.

The typical fuel control for a turbine type power plant such as the JFC-12, JFC-25, JFC-60 and the like, manufactured by the Hamilton Standard Divison of United Aircraft Corporation, the assignee hereof, includes a power lever that when installed on the engine and ultimately to the power lever in the aircraft cockpit to be manipulated by the pilot requires a tedious and sometimes cumbersome installation procedure. (The cockpit power level and the power lever on the fuel control are words of art and each are connected to each other in the aircraft and act in unison). Notwithstanding the fact that the heretofore known fuel control is calibrated at the factory prior to shipment, when installed on the aircraft it is usually re-set in order to match its linkage to the linkage on the aircraft. This marriage of linkage usually occurs in order to adjust for tolerances both in the aircraft linkage and fuel control. It is abundantly important that when the pilot adjusts his power lever to a particular position the fuel control, through its linkages, cams and mechanical connections will produce a given response and will deliver the correct amount of fuel corresponding to this setting.

In the heretofore known fuel controls, as those mentioned above, the typical installation included a power lever cover mounted on the fuel control casing, an index plate keyed to the power lever shaft having a bifurcated or slotted portion extending over the cover adapted to be aligned with arcuately spaced holes and a micro adjusting ring. The power lever cover is movable relative to the casing, the index plate is movable relative to the power lever and power lever cover, and the micro ring is movable relative to the power lever and index plate. In other words, all the above mentioned parts are movable relative to each other and their orientation relative to space and relative to the working parts within the fuel control housing has to be set mechanically with the aid of flow meters and/or test rigs. A better understanding of the prior art control will be discussed in connection with the description of the preferred embodiment presented hereinbelow.

I have found that I can simplify the indexing of the power lever of the fuel control, facilitate its installation in the aircraft, and elimate its micro adjusting ring, the bifurcated or slotted portion on the index plate and its cooperating aligning holes. By virtue of this invention a factory calibrated control can be mounted on the aircraft, fitted to the complementary adaptor without requiring any further adjustments. According to this invention an aligned dowel and slot and a predetermined aligned position of the power lever shaft relative to the dowel and slot, are provided to accept a complementary adaptor mounted in the aircraft that connects to the power lever mounted in the cockpit. This invention provides maximum angular accuracy without binding of the mechanism.

SUMMARY OF THE INVENTION

An object of this invention is to provide an improved method and means for adjusting the power lever of a fuel control for turbine type of power plant.

A still further object is to provide aligning means for a power lever of a fuel control attached to the fuel control housing that has a predetermined relationship with the power lever shaft of the fuel control adapted to be mounted to a complementary adaptor within the aircraft.

Other features and advantages will be apparent from the specification and claims and from the accompanying drawings which illustrate an embodiment of the invention. invention.

BRIEF DESCRIPTION OF THE DRAWINGS

FIG. 1 is a schematic illustration showing the relative parts of the power lever to the engine.

FIG. 2 is a graphical illustration showing the output to input requirements of the power lever.

FIG. 3 shows a prior art power lever and associated indexing mechanism mounted on a fuel control casing shown in phantom.

DESCRIPTION OF THE PREFERRED EMBODIMENT

The problem solved by this invention is the elimination of certain parts on the fuel control that were heretofore utilized for adjusting the power lever position and facilitating the assemblage of the fuel control linkage to the aircraft linkage and its calibration precedure. As schematically illustrated in FIG. 1, the fuel control 10, typically secured to the engine, is adapted to regulate the flow of fuel to the burner section 12 as a function of certain engine operating parameters, including the position of the power lever 16 which is remotely mounted in the cockpit to be adjusted by the pilot. As those familiar with fuel control technology, the power lever positions serve to schedule a ratio of $W_f/P_3$ which is applied to the computer or logic portion of the fuel control where it is compared with an engine operating parameter such as compressor speed, converted into $W_f/P_3$ ratio units, so that the difference is multiplied by actual $P_3$ to obtain the $W_f$ signal for adjusting fuel flow. Thus, it is important to understand that the power lever position does not act directly on the throttle valve but rather serves to impart an input signal that ultimately affects, through interaction of the various parameters, the throttle valve position. Hence, when it is factory calibrated, engine simulated parameters must be applied to the fuel control while adjusting the power lever position. The schedule of the power lever is represented by curve A on the graph depicted on FIG. 2 which is a plot of fuel flow vs. power lever angle (PL ∤). As noted, the range of the power lever is, say 120°, and schedules fuel flow from a no power (off) to maximum power conditions where the flat horizontal portion of the curve represents the idle engine operating conditions.

Figure 4:
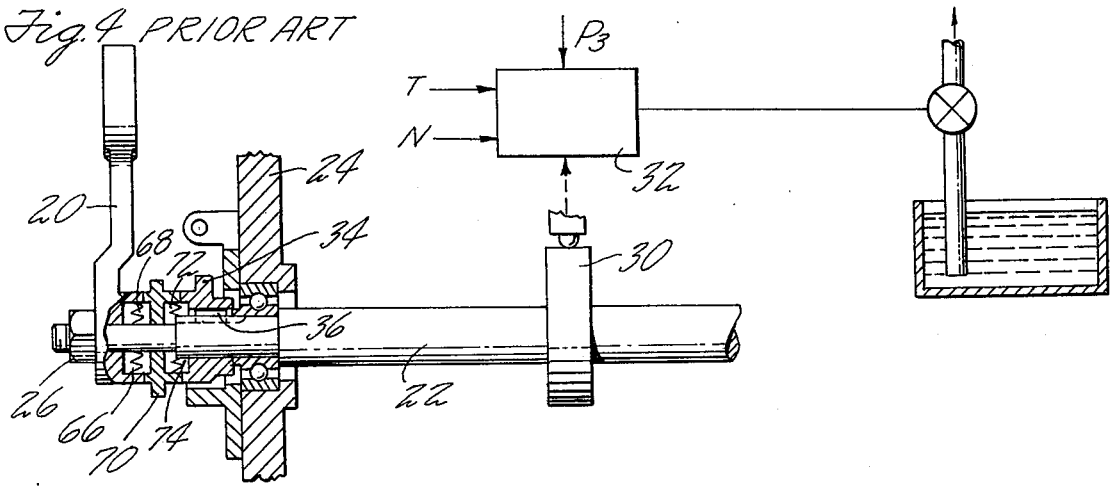
FIG. 4 is a sectional view taken along the lines 4—4 of FIG. 3 and a schematic illustrating the transfer from the power lever to the throttle valve.

FIGS. 3 and 4 are presented herein to describe the prior art power lever, adjusting mechanism, and calibration procedure in order to compare the improvements resulting as a consequence of this invention. to obtain a detailed description of fuel controls reference should be made to the above noted fuel controls, JFC-12, JFC-25 and JFC-60 and the fuel controls described in U.S. Pat. Nos. 2,822,666 granted to S.G. Best and U.S. Pat. No. 3,192,988 granted to R.D. Porter and myself and both being assigned to the same assignee.

The power lever 20 of the fuel control is mounted on the power lever shaft 22 extending from a bore formed in casing 24 and secured thereto by nut 26. The end 28 is adapted to connect to the linkage of the aircraft to connect to the power lever in the aircraft cockpit. (The power lever of the fuel control and the power lever in the cockpit are ultimately connected so that they move in unison). Hence the power lever 20 prior to shipment is oriented with respect to space as taken from some reference point on the fuel control casing so that when it is mounted in the aircraft it aligns with the aircraft linkage. However, due to tolerances and the like these linkages do not always match up, more often than not they don't and hence have to be readjusted so that they do.

The complexity of the adjusting technique is best understood by referring to FIG. 4 where as noted the rotational position of shaft 22 and the cam 30 secured thereto imparts the input signal to the logic portion 32 of the control. As mentioned above, for certain engine operating parameters, such as engine inlet temperataure (T) compressor speed (RPM) (N) and compressor discharge pressure ($P_3$) a certain fuel flow is desired for a given power lever setting. Hence, holding the engine parameters (simulated) constant the power lever shaft is rotated until it produces this value. Typically, this is ascertained by the test-rig operator by noting the change in fuel flow from the transition point of the idle position, i.e. where the fuel flow begins to increase for a change in power lever position.

Thus, in the calibration procedure the index plate 34 keyed to shaft 22 by key 36 is rotated until the bifurcated section 38 aligns with the preselected hole 40 formed in power lever cover 42 and pinned thereto. This is a predetermined position of shaft 22 when it is in the idle position at the transition point noted above. To adjust for any discrepancies the set screws 46 and 48 threaded into upstanding bosses 50 and 52 formed on power lever cover 42 are adjusted when the allen screws 54 and 56 are loosened from the casing which causes the power lever 20 index plate 34, shaft 22 and cam 30 to be repositioned. It being noted that arcuated slots 58 (one being shown) is formed in power lever cover 42 for this purpose and the ends of set screws 46 and 48 bear against the head of allen screw 56. Once the fuel flow is calibrated for this position the allen screws are tightened to secure the power lever cover to the casing.

This also aligns stop 60 which extends to bear against the abutment 62 carried on the index plate 34. The power lever 20 is then oriented with some fixed referenced point on the casing by loosening nut 26 so that lever 20 is free on shaft 22. The cooperating face 66 of power lever 20 is splined to engage the spline face 68 of micro adjusting ring 70 whose other spline face 72 engages the spline face 74 on the index plate 34. By making the splines on the micro adjusting ring to have one different tooth count, the power lever can be positioned relative to the reference point within a fraction of a degree. Once the power lever angle is calibrated the pin in the slot 40 is removed so that the index plate can move its entire range between the opposing faces of stop 60.

Figure 5:
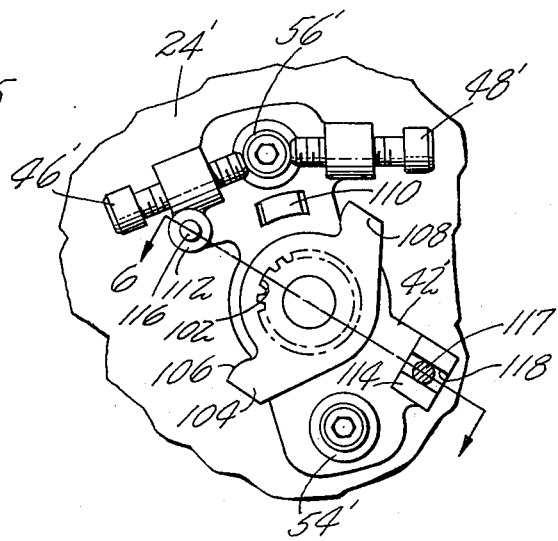
FIG. 5 is a view in elevation of the details of the present invention.
Figure 6:
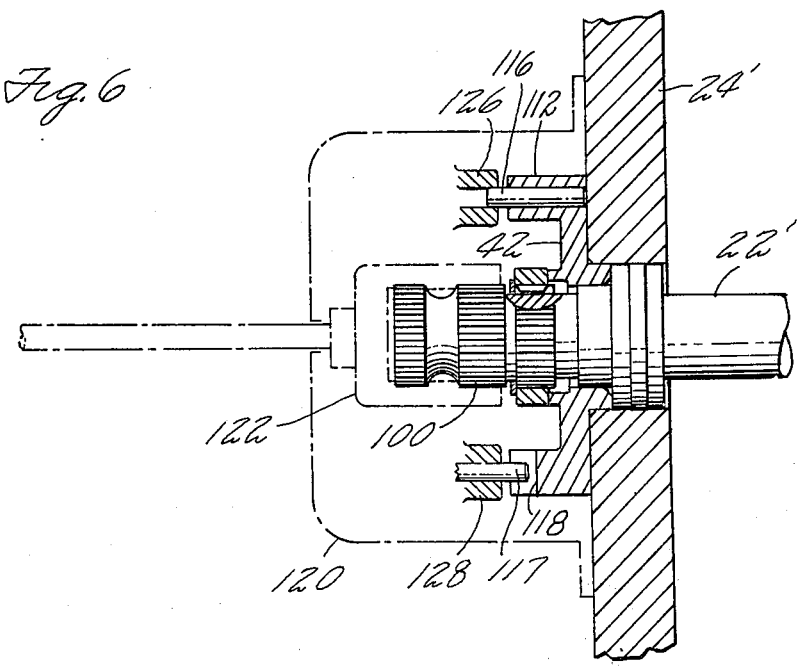
FIG. 6 is a sectional view taken along lines 6—6 and the aircraft attachment shown in phantom.

The improvement is shown in FIGS. 5 and 6 wherein shaft 22' extends beyond casing 24' and power lever cover 42' and has formed therein an outer spline 100 and affixed on it is a preselected oriented point relative to the cam surface (not shown, but similar to cam 30 FIG. 4) as for example the wide tooth 102. Index plate 104, carrying tangs 106 and 108 serve to define the degrees of rotation of the power lever shaft 22' similarly to the index plate of FIG. 4. In this instance tangs 106 and 108 bear against stop 110 projecting from power lever cover 42' permitting the say, 120' range. Also formed on power lever cover 42' are a pair of diametrically opposing bosses 112 and 114. As illustrated in FIG. 5, boss 112 carries dowel 116 whose axis extends in a vertical plane, i.e. in a direction in and out of the paper and boss 114 has a slot 118 whose axis extends in the horizontal direction, i.e. in a plane parallel to the paper. These bosses, with the pin and slot are so oriented that when the large tooth 102 is in the position shown, an imaginary line drawn through the diameter of shaft 22' will be in coincidence with the center line of the slot 118 and in coincidence with a line bisecting the dowel 116.

The calibration of this power lever is simple in comparison with heretofore practices as all is required is aligning the oriented points described above as shown in FIG. 5, loosening the allen screws and adjusting the set screws 46' and 48' until the transition point of the idle flat of curve in FIG. 2 is achieved.

It is also to be noted that the micro adjusting ring, the bifurcated section and corresponding holes on the power lever cover are eliminated. The cumberson requirement of inserting the pin in the holes and its removal is also eliminated.

An adaptor 120, already in the aircraft carries a complementary spline 122 with the wide tooth and a complementary slot formed on boss 126 to receive the dowel 116 and a vertical dowel 124 extending from boss 128 to engage slot 118. The dowel and slot arrangement on the fuel control serves to define a reference point for the adaptor. Since the dowel and slot are oriented relative to the power lever shaft, the complemental alignment of the adaptor will be likewise oriented, as a consequence, the power lever of the cockpit can be quickly and easily connected up with the fuel control without the need of any further adjustments and it will be properly indexed. Whenever the fuel control is replaced, since the contact points are always in the same position, there are no adjustments needed for the replacement fuel control.

It should be understood that the invention is not limited to the particular embodiments shown and described herein, but that various changes and modifications may be made without departing from the spirit or scope of this novel concept as defined by the following claims.

I claim:

1. Power input means for a fuel control for a turbine type power plant adapted to mate with a power lever in the cockpit of an aircraft powered by said power plant, a housing supporting the fuel control operative mechanism, said power input means including a shaft extending through a bore formed in said housing and operative to provide one of the input signals to said fuel control, the shaft having a relationship to the fuel flow controlled by said fuel control, means including an adjustment plate on said housing movable to calibrate said shaft for a given fuel flow at a given power plant operation, means providing a reference to which said power lever in said cockpit mates with said shaft, said means including a pair of mounting supports formed on said adjustment plate and spaced in axial alignment on opposing sides of said shaft, a predetermined portion on said shaft aligned in fixed relationship to said pair of mounting supports at a predetermined power plant operating condition.

2. Power input means as claimed in claim 1 including an adaptor for said cockpit power lever, said mounting support including means for receiving dowel pins connected to complementary openings in said adaptor whereby said adaptor indexes said power lever of said cockpit to said shaft.

3. Power input means as claimed in claim 2 including spline means having a spline on one end of said shaft, said predetermined portion being a tooth made wider than the other teeth of said spline and being adaptable to mate with a complementary spline on said adaptor.

4. Power input means for a fuel control for a turbine type power plant adapted to mate with a power lever in the cockpit of an aircraft powered by said power plant, a housing supporting the fuel control operative mechanism, said power input means including a shaft extending through a bore formed in said housing and operative to provide one of the input signals to said fuel control, the shaft having a relationship to the fuel flow controlled by said fuel control, means including an adjustment plate on said housing movable to calibrate said shaft for a given fuel flow at a given power plant operation, an index plate supported on said shaft and movable therewith, a projection on said adjustment plate, circumferentially spaced tangs on said index plate extending outwardly from said shaft and adapted to abut against said projection so as to limit the rotational travel of said shaft, means providing a reference to which said power lever in said cockpit mates with said shaft, said means including a pair of mounting supports formed on said adjustment plate and spaced in axial alignment on opposing sides of said shaft, a predetermined portion on said shaft aligned in fixed relationship to said pair of mounting supports at a predetermined power plant operating condition.

5. A power lever system for a fuel control for a turbine type of power plant adapted to connect to the power lever in the aircraft powered by said power plant, said power lever system including means for scheduling fuel flow in accordance with preselected power plant operating parameters, said fuel control including a housing supporting calculating means responding to said power plant operating parameters, a shaft extending through a bore formed in said housing operatively connected to said calculating means for providing an input signal thereto, a resettable power lever cover supported to said housing and having a bore through which said shaft extends, means on said power lever cover for adjusting its positions, reference means on said power lever cover including at least two mounting support points spaced from said shaft and each diametrically opposed, a reference point on said shaft adapted to align with said two mounting support points whereby said power lever cover can be adjusted by said adjusting means to index said shaft for producing a predetermined input signal to said calculating means for a given power plant operating condition and indexing said mounting support points to provide a reference point for the power lever of the aircraft so that when connected to said shaft it produces a predetermined input signal for each given position thereof.

6. A power lever system as claimed in claim 5 including an index plate juxtaposed to said power lever cover having radially extending circumferentially spaced tangs and being secured to said shaft for movement therewith, an abutment extending from said power lever cover engageable with said tangs to define the extent of rotational movement of said shaft.

7. The method of adjusting the power shaft of a fuel control so that it produces a predetermined input signal for each given positon comprising the steps of:

assemblying fuel control components parts including said shaft within the fuel control housing, mounting a cover plate on said housing, said power shaft extending through said cover plate and said housing, said cover plate having reference points spaced in axial alignment and on opposing sides of said shaft, setting said shaft to a predetermined position relative to said reference points on said cover when the fuel control produces an output responding to simulated engine operating conditions, resetting said cover with respect to said housing while maintaining the power shaft to the given reference points obtained in the step immediately above so that the output reaches a predetermined value.

* * * * *

UNITED STATES PATENT OFFICE
CERTIFICATE OF CORRECTION

PATENT NO. : 3,977,183
DATED : August 31, 1976
INVENTOR(S) : Charles F. Stearns

It is certified that error appears in the above-identified patent and that said Letters Patent are hereby corrected as shown below:

| | |
|---|---|
| Column 1, line 19 | "level" should be -- lever -- |
| Column 2, line 15 | delete second occurrence of "invention" |
| Column 3, line 4 | "to" should be -- To -- |
| Column 3, line 52 | "arcuated" should be -- arcuate -- |
| Column 4, line 16 | 120' should be -- 120° -- |

Signed and Sealed this

Thirtieth Day of November 1976

[SEAL]

Attest:

RUTH C. MASON
Attesting Officer

C. MARSHALL DANN
Commissioner of Patents and Trademarks